(12) United States Patent
San et al.

(10) Patent No.: US 12,283,022 B2
(45) Date of Patent: Apr. 22, 2025

(54) IMAGE PROCESSING METHOD AND IMAGE PROCESSING CIRCUIT FOR COMPENSATING MOTION VECTORS OF INTERPOLATED FRAME

(71) Applicant: Realtek Semiconductor Corp., HsinChu (TW)

(72) Inventors: Guangyu San, Suzhou (CN); Fangqi Xiong, Suzhou (CN)

(73) Assignee: Realtek Semiconductor Corp., HsinChu (TW)

( * ) Notice: Subject to any disclaimer, the term of this patent is extended or adjusted under 35 U.S.C. 154(b) by 432 days.

(21) Appl. No.: 17/842,736

(22) Filed: Jun. 16, 2022

(65) Prior Publication Data

US 2023/0162322 A1 May 25, 2023

(30) Foreign Application Priority Data

Nov. 23, 2021 (CN) .......................... 202111393858.5

(51) Int. Cl.
*G06T 3/4007* (2024.01)
*G06T 5/50* (2006.01)
(Continued)

(52) U.S. Cl.
CPC .............. *G06T 3/4007* (2013.01); *G06T 7/13* (2017.01); *G06T 7/248* (2017.01); *G06T 2207/20192* (2013.01)

(58) Field of Classification Search
CPC ......... G06T 3/4007; G06T 7/13; G06T 7/248; G06T 2207/20192
See application file for complete search history.

(56) References Cited

U.S. PATENT DOCUMENTS 6,219,436 B1 * 4/2001 De Haan ................ H04N 19/51
  73/488
9,621,917 B2 * 4/2017 Kottke ................. H04N 19/517
(Continued)

FOREIGN PATENT DOCUMENTS

CN         102595089 A      7/2012
TW         202023257 A      6/2020
WO    WO-2015139453 A1 *   9/2015    ........... G06T 7/2006

OTHER PUBLICATIONS

M. M. Cekic and U. Bayazit, "New frame rate up-conversion based on foreground/background segmentation," 2011 IEEE International Conference on Multimedia and Expo, Barcelona, Spain, 2011, pp. 1-6, doi: 10.1109/ICME.2011.6011853. (Year: 2011).*

(Continued)

*Primary Examiner* — Siamak Harandi
*Assistant Examiner* — Helen Deng Shi
(74) *Attorney, Agent, or Firm* — Winston Hsu

(57) ABSTRACT

The present invention provides an image processing method, wherein the image processing method includes the steps of: receiving an image signal, wherein the image signal comprises a first frame and a second frame; performing motion estimation on the first frame and the second frame to generate an interpolated frame; for each of a plurality of areas of the interpolated frame, determining whether there is a block in the first frame that moves to the area, and determine whether there is a block in the second frame that moves to the area, to determine whether the area belongs to a cover area or an uncover area; and in response to a determination result indicating that the area belongs to the cover area or the uncover area, adjusting image contents of the interpolated frame.

10 Claims, 3 Drawing Sheets

(51) Int. Cl.
    *G06T 7/13*        (2017.01)
    *G06T 7/246*       (2017.01)

(56)         References Cited

U.S. PATENT DOCUMENTS 11,070,813 B2 *   7/2021   Socek .................. H04N 19/137
2003/0206246 A1 *  11/2003   De Haan ................ G06T 7/238
                                                         375/E7.263
2009/0147851 A1 *   6/2009   Klein Gunnewiek ........................
                                                         H04N 19/573
                                                         375/E7.123

OTHER PUBLICATIONS

Ching-Ting Hsu, Mei-Juan Chen and Chin-Hui Huang, "High performance spatial-temporal de-interlacing technique using interfield information," 2004 IEEE International Symposium on Circuits and Systems (ISCAS), Vancouver, BC, Canada, 2004, pp. II-213, doi: 10.1109/ISCAS.2004.1329246. (Year: 2004).*

* cited by examiner

IMAGE PROCESSING METHOD AND IMAGE PROCESSING CIRCUIT FOR COMPENSATING MOTION VECTORS OF INTERPOLATED FRAME

BACKGROUND OF THE INVENTION

1. Field of the Invention

The present invention relates to a signal processing method.

2. Description of the Prior Art

For the purpose of increasing a frame rate to obtain a better display effect, an interpolated frame between two frames may be generated. Motion vector(s) and related image contents may be generated by motion estimation and motion compensation (MEMC). The motion estimation may cause a halo effect when an object moves fast in the image, however. A common MEMC process for eliminating the halo effect has the following problems: a width of the halo is too large; edges of the halo are misaligned; and strength of halo reduction is too strong and thereby introduces edge flicker.

SUMMARY OF THE INVENTION

It is therefore an objective of the present invention to provide an image processing method, which can determine whether an area near an edge of the interpolated frame is located in a cover area or an uncover area, and adjust the image content of the interpolated frame accordingly, to effectively alleviate the halo effect caused by the interpolated frame, to solve the problems of the related art.

According to one embodiment of the present invention, an image processing method comprises the steps of: receiving an image signal, wherein the image signal comprises a first frame and a second frame; performing motion estimation on the first frame and the second frame to generate an interpolated frame; for each of a plurality of areas of the interpolated frame, determining whether there is a block in the first frame that moves to the area, and determine whether there is a block in the second frame that moves to the area, to determine whether the area belongs to a cover area or an uncover area; and in response to a determination result indicating that the area belongs to the cover area or the uncover area, adjusting image contents of the interpolated frame.

According to one embodiment of the present invention, an image processing circuit comprising a receiving circuit and a MEMC circuit is disclosed. The receiving circuit is configured to receive an image signal, wherein the image signal comprises a first frame and a second frame. The MEMC circuit is configured to perform motion estimation on the first frame and the second frame to generate an interpolated frame; and for each of a plurality of areas of the interpolated frame, determine whether there is a block in the first frame that moves to the area, and determine whether there is a block in the second frame that moves to the area, to determine whether the area belongs to a cover area or an uncover area; and in response to a determination result indicating that the area belongs to the cover area or the uncover area, adjust image contents of the interpolated frame.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
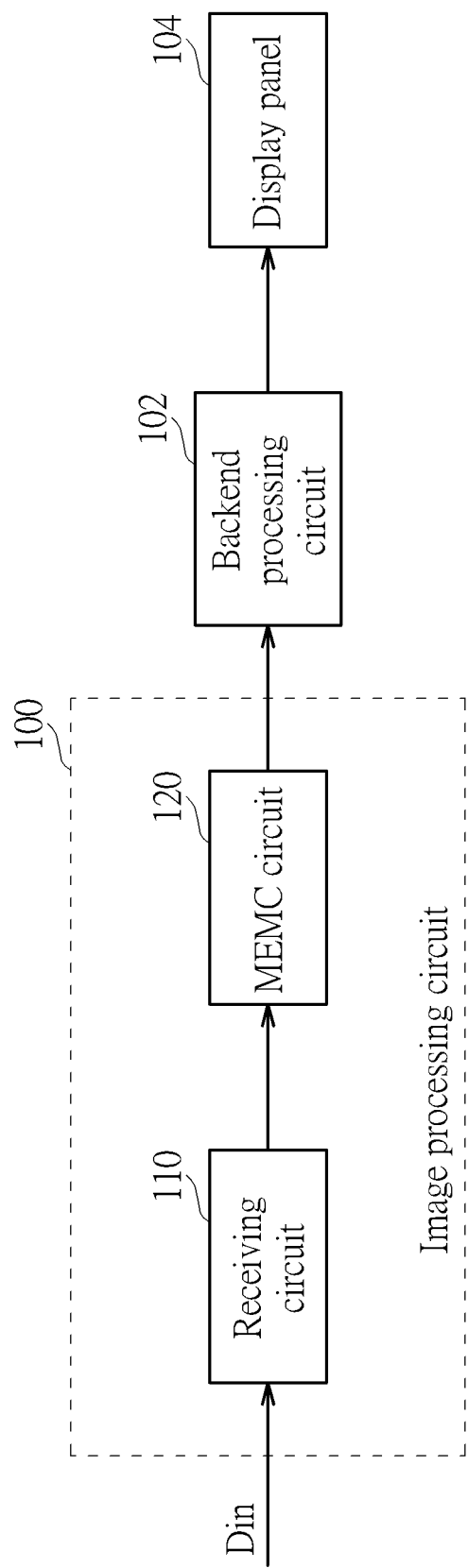
FIG. 1 is a diagram illustrating an image processing circuit according to one embodiment of the present invention.

FIG. 1 is a diagram illustrating an image processing circuit 100 according to one embodiment of the present invention. As shown in FIG. 1, the image processing circuit 100 comprises a receiving circuit 110 and a motion estimation and motion compensation (MEMC) circuit 120. In this embodiment, the image processing circuit 100 may perform operations of increasing frame rates, for example, the image processing circuit 100 receives an image signal Din and generates a plurality of interpolated frames according to a plurality of frames of the image signal Din, where the plurality of frames and the plurality of interpolated frames are transmitted to a display panel 104 through a backend processing circuit 102 for displaying.

Figure 2:
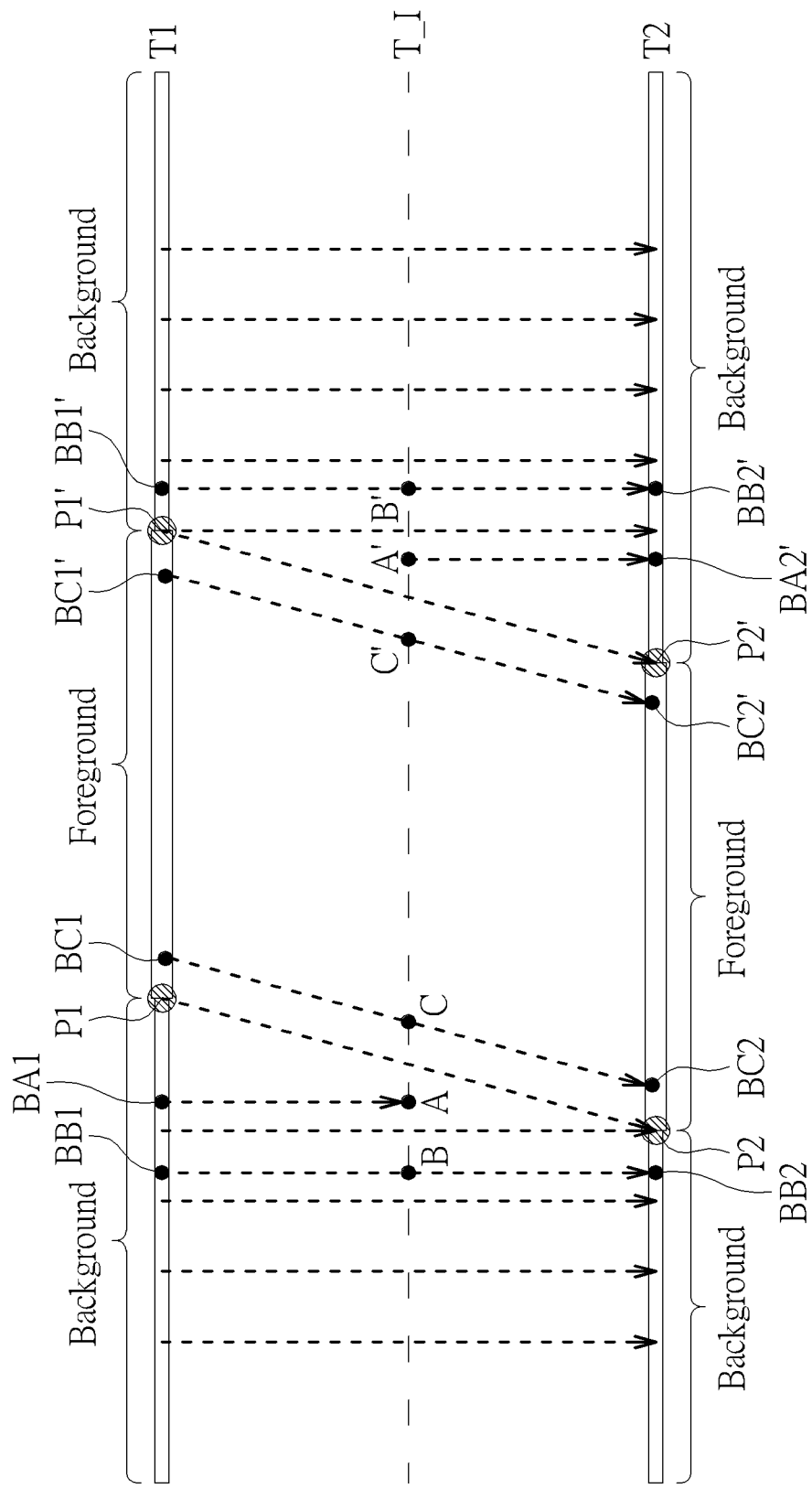
FIG. 2 is a diagram illustrating modification of motion vectors of an outer region of an edge of a foreground in an interpolated frame according to an embodiment of the present invention.

Regarding detailed operations of the image processing circuit 100, the receiving circuit 110 receives the image signal Din, where the image signal Din comprises a first frame T1 and a second frame T2 shown in FIG. 2. Then, the MEMC circuit 120 performs motion estimation on the contents of the first frame T1 and the second frame T2 to determine a moving speed of each block, and performs motion compensation operation to generate the interpolated frame T_I and related information (e.g., which block of the first frame T1 and/or the second frame T2 is moved to the block of the interpolated frame T_1). Because a person skilled in the art should understand operations of generating the interpolated frame T_I, and the focus of the present invention is not on the part of generating the interpolated frame T_I, so the details are omitted here. In addition, since a foreground object in the first frame T1 and the second frame T2 may move relative to the background, a conventional motion estimation manner may make motion vector(s) of a junction of the foreground object and the background in the interpolated frame T_I inaccurate, thereby causing the halo effect mentioned in the related art. Therefore, after the motion vector(s), moving speed(s) and related image information of the interpolated frame T_I are generated in this embodiment, the MEMC circuit 120 further determines if an area near the edge of the interpolated frame T_I is in the cover area or the uncover area, and then performs motion vector or moving speed modification on the area located in the cover area and the uncover area, to prevent the first frame T1, the interpolated frame T_I and the second frame T2 from the halo effect when being displayed on the display panel 104.

Specifically, the MEMC circuit 120 may determine edges of the foreground in the first frame T1 and the second frame T2 according to at least one motion vector of the first frame T1 and the second frame T2, such as the foreground edge P1 in the first frame T1 and the foreground edge P2 in the second frame T2 shown in FIG. 2. In one embodiment, the foreground shown in FIG. 2 may comprise at least one block, wherein a size of each block can be determined according to the designer's consideration, for example, the size of each block can be 8*8 pixels, 16*16 pixels, etc. Then, the MEMC circuit 120 refers to the foreground edge P1 in the first frame T1 and the foreground edge P2 in the second frame T2, or the moving speed of the block corresponding to the foreground of the first frame T1 and the second frame T2 to determine a range near the foreground edge of the interpolated frame T_I. For example, the MEMC circuit 120 may calculate a center point of the foreground edges P1 and P2 as the foreground edge of the interpolated frame T_1, and then select a range according to the foreground edge of the interpolated frame T_1. In one embodiment, the determined range near the foreground edge of the interpolated frame T_1 includes an area larger than an area from the foreground edge P1 of the first frame T1 to the edge P2 of the second frame T2, for example, the range between BC1 and BB1 shown in FIG. 2.

Then, for a plurality of areas within a range near the foreground edge of the interpolated frame T_1, the MEMC circuit 120 determines whether each area is located in the cover area or the uncover area, wherein the cover area or the uncover area is an area between the foreground edges of the first frame T1 and the second frame T2. For example, the cover area is the area between the foreground edge P1 and the foreground edge P2. Taking the left side of the foreground in FIG. 2 as an illustration, it is assumed that the interpolated frame T_I includes areas A, B and C, where the size of each of the areas A, B and C can be equal to one block of the first frame T1 or any other suitable size, the MEMC circuit 120 determines whether there is a block in the first frame T1 and whether there is a block in the second frame T2 that moves to the areas A, B, and C of the interpolated frame T_I, so as to determine whether the areas A, B and C belong to the cover area or the uncover area. Specifically, for any one of the areas A, B and C, if only one of the first frame T1 and the second frame T2 has a block that moves to the area of the interpolated frame T_1, it is determined that the area belongs to the cover area or the uncover area. If both the first frame T1 and the second frame T2 have blocks moving to this area of the interpolated frame T_1, it is determined that this area does not belong to the cover area, and also does not belong to the uncover area. In detail, for the area A, because the area A is mainly moved by a block BA1 of the first frame T1 (that is, most of the pixel values of the area A are generated according to the block BA1), and the second frame T2 does not have any block that moves to the area A, the MEMC circuit 120 determines that the area A belongs to the cover area. For the area B, because both the first frame T1 and the second frame T2 have blocks that move to the area B (for example, most of the pixel values of the area B are generated according to the blocks BB1 and BB2), the MEMC circuit 120 determines that the area B does not belong to the cover area or the uncover area. For the area C, because both the first frame T1 and the second frame T2 have blocks that move to the area C (for example, most of the pixel values of the area C are generated according to the blocks BC1 and BC2), the MEMC circuit 120 determines that the area C does not belong to the cover area or the uncover area.

Similarly, the right side of the foreground of the first frame T1 and the second frame T2 has a foreground edge P1' and a foreground edge P2' respectively. The MEMC circuit 120 may calculate a center point of the foreground edges P1' and P2' as the foreground edge of the interpolated frame T_1, and then select a range according to the foreground edge of the interpolated frame T_1. In one embodiment, the determined range near the foreground edge of the interpolated frame T_1 includes an area larger than an area from the foreground edge P1' of the first frame T1 to the edge P2' of the second frame T2, for example, the range between BB2' and BC2' shown in FIG. 2 . Taking the right side of the foreground in FIG. 2 as an illustration, it is assumed that the interpolated frame T_I includes areas A', B' and C', where the size of each of the areas A', B' and C' can be equal to one block of the first frame T1 or any other suitable size, the MEMC circuit 120 determines whether there is a block in the first frame T1 and whether there is a block in the second frame T2 that moves to the areas A', B', and C' of the interpolated frame T_I, so as to determine whether the areas A', B' and C' belong to the cover area or the uncover area. Specifically, for any one of the areas A' , B' and C', if only one of the first frame T1 and the second frame T2 has a block that moves to the area of the interpolated frame T_1, it is determined that the area belongs to the cover area or the uncover area. If both the first frame T1 and the second frame T2 have blocks moving to this area of the interpolated frame T_1, it is determined that this area does not belong to the cover area, and also does not belong to the uncover area. In detail, for the area A', because the area A' is mainly moved by a block BA2' of the second frame T2 (that is, most of the pixel values of the area A' are generated according to the block BA2'), and the first frame T1 does not have any block that moves to the area A', the MEMC circuit 120 determines that the area A' belongs to the uncover area. For the area B', because both the first frame T1 and the second frame T2 have blocks that move to the area B' (for example, most of the pixel values of the area B' are generated according to the blocks BB1' and BB2'), the MEMC circuit 120 determines that the area B' does not belong to the cover area or the uncover area. For the area C', because both the first frame T1 and the second frame T2 have blocks that move to the area C' (for example, most of the pixel values of the area C' are generated according to the blocks BC1' and BC2'), the MEMC circuit 120 determines that the area C' does not belong to the cover area or the uncover area.

After determining whether a plurality of areas near the foreground edge of the interpolated frame T_1 belong to the cover area or the uncover area, the MEMC circuit 120 performs image adjustment on the area belonging to the cover area or the uncover area. For example, since the area A is determined to belong to the cover area, the MEMC circuit 120 can change the previously determined motion vector or the moving speed of the area A of the interpolated frame T_1 according to the motion vector or the moving speed of the block BA1, to improve image quality near the foreground edge of interpolated frame T_I. For example, assuming that the block BA1 of the first frame T1 has a motion vector MV1 (i.e., the amount of movement of the block BA1 relative to a block of a reference frame), the motion vector of the area A can be directly modified to be the motion vector MV1 (i.e., the amount of movement of the block relative to the reference frame). Similarly, since the area A' is determined to belong to the uncover area, the MEMC circuit 120 can change the previously determined motion vector or the moving speed of the area A' of the interpolated frame T_1 according to the motion vector or the moving speed of the block BA2', to improve image quality near the foreground edge of interpolated frame T_I. For example, assuming that the block BA2' of the second frame T2 has a motion vector MV2 (i.e., the amount of movement of the block BA2' relative to a block of a reference frame), the motion vector of the area A' can be directly modified to be the motion vector MV2 (i.e., the amount of movement of the block relative to the reference frame). In addition, since the areas B, C, B' and C' do not belong to the cover area or the uncover area, the MEMC circuit 120 will not additionally adjust the motion vectors and moving speeds of these areas, that is, the areas B, C, B' and C' maintain the previously determined motion vectors and moving speeds.

Figure 3:
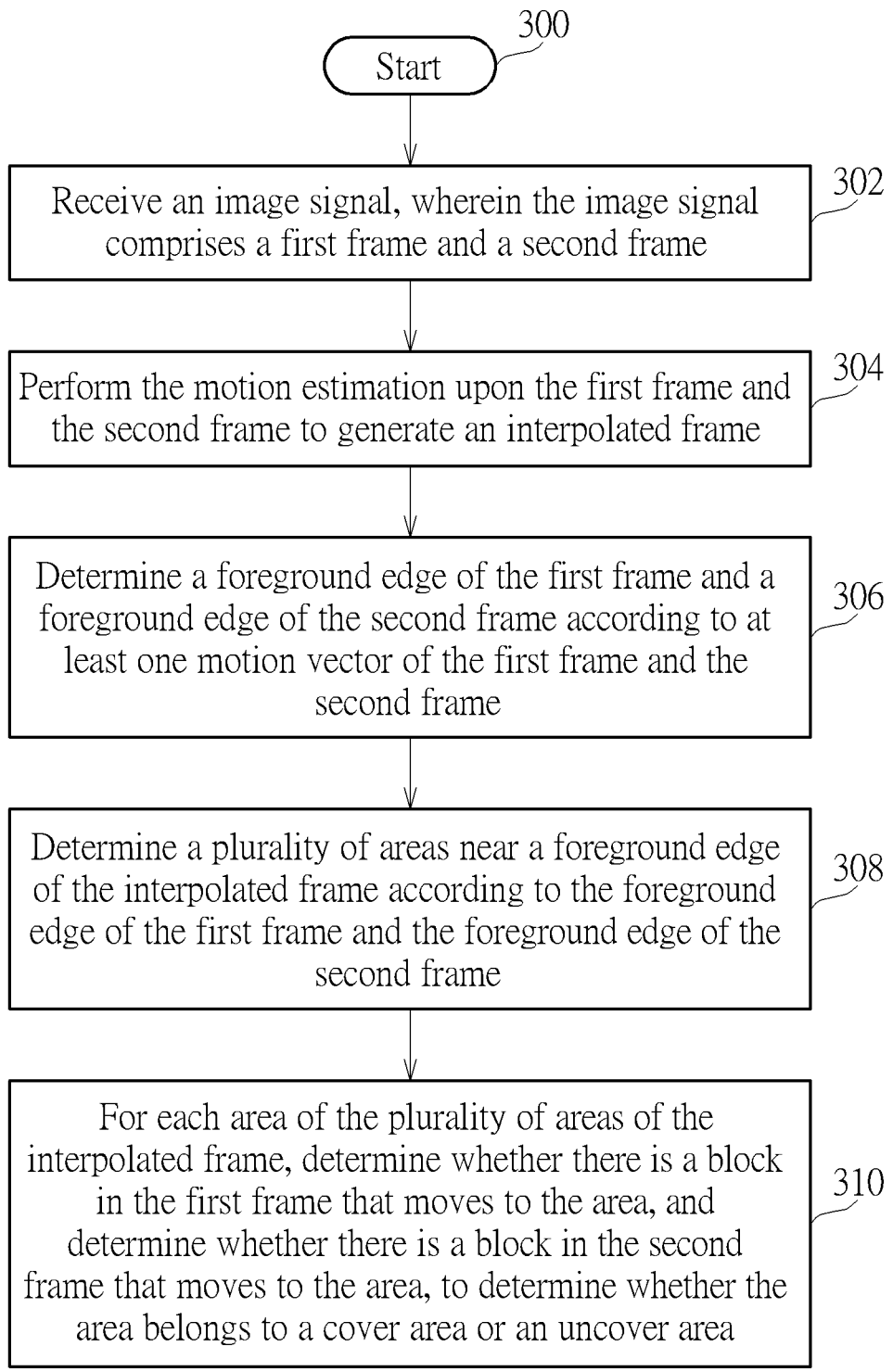
FIG. 3 is a flowchart illustrating an image processing method according to one embodiment of the present invention.

In light of above, after the MEMC circuit 120 determines the interpolated frame T_I, the MEMC circuit 120 will further determine whether the areas near the foreground edge of the interpolated frame T_I belong to the cover area or the uncover area, so as to determine whether to perform image content adjustment on the plurality of areas, so this embodiment can effectively improve the image quality near the foreground edge of the interpolated frame T_I, and avoid the halo effect mentioned in the prior art FIG. 3 is a flowchart illustrating an image processing method according to one embodiment of the present invention. Referring to FIG. 1 to FIG. 3 and the above embodiments, the flow is described as follows.

Step 300: the flow starts.

Step 302: receive an image signal, wherein the image signal comprises a first frame and a second frame.

Step 304: perform the motion estimation upon the first frame and the second frame to generate an interpolated frame.

Step 306: determine a foreground edge of the first frame and a foreground edge of the second frame according to at least one motion vector of the first frame and the second frame.

Step 308: determine a plurality of areas near a foreground edge of the interpolated frame according to the foreground edge of the first frame and the foreground edge of the second frame.

Step 310: for each area of the plurality of areas of the interpolated frame, determine whether there is a block in the first frame that moves to the area, and determine whether there is a block in the second frame that moves to the area, to determine whether the area belongs to a cover area or an uncover area.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image processing method, comprising:
    receiving an image signal, wherein the image signal comprises a first frame and a second frame;
    performing motion estimation on the first frame and the second frame to generate an interpolated frame;
    determining a foreground edge of the first frame and a foreground edge of the second frame according to at least one motion vector of the first frame and the second frame;
    determining a plurality of areas of the interpolated frame according to the foreground edge of the first frame and the foreground edge of the second frame;
    for each of the plurality of areas of the interpolated frame, determining whether there is a block in the first frame that moves to the area, and determine whether there is a block in the second frame that moves to the area, to determine whether the area belongs to a cover area or an uncover area; and
    in response to a determination result indicating that the area belongs to the cover area or the uncover area, adjusting image contents of the interpolated frame.

2. The image processing method of claim 1, wherein the step of for each of the plurality of areas of the interpolated frame, determining whether there is the block in the first frame that moves to the area, and determine whether there is the block in the second frame that moves to the area, to determine whether the area belongs to the cover area or the uncover area comprises:
    in response to the first frame having a first block that moves to the area, and the second frame not having any block that moves to the area, determining that the area belongs to the cover area;
    in response to the first frame not having any block that moves to the area, and the second frame having a second block that moves to the area, determining that the area belongs to the uncover area; and
    in response to both the first frame and the second frame having blocks that move to the area, determining that the area does not belong to the cover area, nor does it belong to the uncover area.

3. The image processing method of claim 2, wherein the step of in response to the determination result indicating that the area belongs to the cover area or the uncover area, adjusting the image contents of the interpolated frame comprises:
    in response to determination result indicating that the area belongs to the cover area, using a motion vector or a moving speed of the first block to modify a motion vector or a moving speed of the area of the interpolated frame.

4. The image processing method of claim 2, wherein the step of in response to the determination result indicating that the area belongs to the cover area or the uncover area, adjusting the image contents of the interpolated frame comprises:
    in response to the determination result indicating that the area belongs to the uncover area, using a motion vector or a moving speed of the second block to modify a motion vector or a moving speed of the area of the interpolated frame.

5. The image processing method of claim 2, further comprising:
    in response to the determination result indicating that the area does not belong to the cover area and also does not belong to the uncover area, not modifying a motion vector or a moving speed of the area of the interpolated frame.

6. An image processing circuit, comprising:
    a receiving circuit, configured to receive an image signal, wherein the image signal comprises a first frame and a second frame;
    a motion estimation and motion compensation (MEMC) circuit, coupled to the receiving circuit, configured to perform motion estimation on the first frame and the second frame to generate an interpolated frame; determine a foreground edge of the first frame and a foreground edge of the second frame according to at least one motion vector of the first frame and the second frame, and determine a plurality of areas of the interpolated frame according to the foreground edge of the first frame and the foreground edge of the second frame; and for each of the plurality of areas of the interpolated frame, determine whether there is a block in the first frame that moves to the area, and determine whether there is a block in the second frame that moves to the area, to determine whether the area belongs to a cover area or an uncover area; and in response to a determination result indicating that the area belongs to the cover area or the uncover area, adjust image contents of the interpolated frame.

7. The image processing circuit of claim 6, wherein in response to the first frame having a first block that moves to the area, and the second frame not having any block that moves to the area, the MEMC circuit determines that the area belongs to the cover area; in response to the first frame not having any block that moves to the area, and the second frame having a second block that moves to the area, the MEMC circuit determines that the area belongs to the uncover area; and in response to both the first frame and the second frame having blocks that move to the area, the MEMC circuit determines that the area does not belong to the cover area, nor does it belong to the uncover area.

8. The image processing circuit of claim 7, wherein in response to determination result indicating that the area belongs to the cover area, the MEMC circuit determines uses a motion vector or a moving speed of the first block to modify a motion vector or a moving speed of the area of the interpolated frame.

9. The image processing circuit of claim 7, wherein in response to the determination result indicating that the area belongs to the uncover area, the MEMC circuit determines uses a motion vector or a moving speed of the second block to modify a motion vector or a moving speed of the area of the interpolated frame.

10. The image processing circuit of claim 7, wherein in response to the determination result indicating that the area does not belong to the cover area and also does not belong to the uncover area, the MEMC circuit does not modify a motion vector or a moving speed of the area of the interpolated frame.

* * * * *